(12) United States Patent
Nagarajan et al.

(10) Patent No.: US 12,259,739 B2
(45) Date of Patent: Mar. 25, 2025

(54) ADVANCED PRESSURE BASED MASS FLOW CONTROLLERS AND DIAGNOSTICS

(71) Applicant: Illinois Tool Works Inc., Glenview, IL (US)

(72) Inventors: Arun Nagarajan, Freemont, CA (US); Daniel Mudd, Freemont, CA (US); Mohamed Saleem, Freemont, CA (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 16/688,950

(22) Filed: Nov. 19, 2019

(65) Prior Publication Data

US 2020/0348702 A1 Nov. 5, 2020

Related U.S. Application Data

(60) Provisional application No. 62/841,110, filed on Apr. 30, 2019.

(51) Int. Cl.
*G05D 7/06* (2006.01)
*G01F 1/00* (2022.01)
*G01L 9/00* (2006.01)

(52) U.S. Cl.
CPC ............. *G05D 7/0623* (2013.01); *G01F 1/00* (2013.01); *G01L 9/0098* (2013.01);
(Continued)

(58) Field of Classification Search
CPC .. G05D 7/0617; G05D 7/0623; G05D 7/0635; Y10T 137/7761
(Continued)

(56) References Cited

U.S. PATENT DOCUMENTS 4,938,252 A * 7/1990 Piechnick .......... G05D 16/2013
137/486
5,062,446 A 11/1991 Anderson
(Continued)

FOREIGN PATENT DOCUMENTS

JP 201828747 2/2018
JP 2019028747 2/2019
(Continued)

OTHER PUBLICATIONS

Extended European Search Report issued in related pending European Application No. 20167956.0.
(Continued)

*Primary Examiner* — William M McCalister
(74) *Attorney, Agent, or Firm* — McAndrews, Held & Malloy, Ltd.

(57) ABSTRACT

A mass flow controller for controlling flow rate comprising a controller, a valve assembly, and at least one pressure sensor, valve position sensor, and temperature sensor; wherein, at least one of the sensors is a semiconductor based sensor. The valve assembly is in fluid communication with at least one upstream location and at least one downstream location. The at least one pressure sensor is in fluid communication with the at least one upstream location and the at least one downstream location. The valve assembly can comprise at least one piezoelectric or solenoid valve. The controller is communicable coupled with the valve assembly and at least one of the sensors. The controller determines at least one of: pressure; position; and temperature. The controller further causes an adjustment to valve stroke based on an actual fluid flow rate and at least one of the pressure, position, temperature, and a predetermined value.

18 Claims, 5 Drawing Sheets

(52) U.S. Cl.
CPC ......... *G05D 7/0617* (2013.01); *G05D 7/0647* (2013.01); *G05D 7/0635* (2013.01)

(58) Field of Classification Search
USPC ..................................................... 137/487.5
See application file for complete search history.

(56) References Cited

U.S. PATENT DOCUMENTS

| | | | |
|---|---|---|---|
| 5,549,137 A * | 8/1996 | Lenz | G05D 7/005 137/86 |
| 5,669,408 A * | 9/1997 | Nishino | G05D 7/0635 137/487.5 |
| 5,816,285 A | 10/1998 | Ohmi et al. | |
| 5,848,088 A * | 12/1998 | Mori | H01S 5/0262 372/50.21 |
| 5,915,401 A * | 6/1999 | Menard | G05D 16/202 137/12 |
| 5,925,829 A | 7/1999 | Laragione et al. | |
| 6,119,710 A | 9/2000 | Brown | |
| 6,178,995 B1 * | 1/2001 | Ohmi | G05D 7/0635 137/486 |
| 6,216,726 B1 | 4/2001 | Brown et al. | |
| 6,845,659 B2 | 1/2005 | Lull | |
| 7,272,512 B2 | 9/2007 | Wang et al. | |
| 7,431,945 B2 | 10/2008 | Ban et al. | |
| 8,271,210 B2 | 9/2012 | Chung et al. | |
| 8,504,318 B2 | 8/2013 | Mendelson et al. | |
| 8,744,784 B2 | 6/2014 | Yasuda et al. | |
| 9,256,228 B2 | 2/2016 | Smirnov et al. | |
| 9,256,288 B2 | 2/2016 | Smirnov et al. | |
| 9,400,004 B2 | 7/2016 | Monkowski et al. | |
| 9,523,435 B2 | 12/2016 | Monkowski | |
| 9,904,297 B2 | 2/2018 | Monkowski | |
| 9,983,595 B2 | 5/2018 | Monkowski et al. | |
| 10,031,005 B2 | 7/2018 | Ding | |
| 10,054,959 B2 | 8/2018 | Somani | |
| 10,890,475 B2 | 1/2021 | Shakudo | |
| 11,789,435 B2 | 10/2023 | Takijiri | |
| 11,841,720 B2 | 12/2023 | Tokunaga | |
| 11,860,018 B2 | 1/2024 | Hoke | |
| 2002/0005785 A1 * | 1/2002 | Ohmi | G05D 7/0635 340/611 |
| 2002/0179149 A1 * | 12/2002 | Ohmi | G05D 7/0658 137/487.5 |
| 2004/0204794 A1 | 10/2004 | Ohmi et al. | |
| 2005/0080550 A1 * | 4/2005 | Nakamura | G01F 1/46 701/114 |
| 2006/0008328 A1 | 1/2006 | Morgan et al. | |
| 2009/0019939 A1 * | 1/2009 | Shikata | F16L 41/008 73/700 |
| 2009/0165534 A1 * | 7/2009 | Kohno | G01M 3/2815 73/49.1 |
| 2009/0326719 A1 * | 12/2009 | Nagase | F16K 37/0091 700/282 |
| 2012/0031500 A1 * | 2/2012 | Hirose | C23C 16/45561 137/14 |
| 2015/0121988 A1 | 5/2015 | Banares et al. | |
| 2015/0362391 A1 * | 12/2015 | Suzuki | G01L 9/0055 137/511 |
| 2016/0195415 A1 * | 7/2016 | Lull | G01L 9/0054 73/861.01 |
| 2016/0216713 A1 | 7/2016 | Mudd et al. | |
| 2017/0052546 A1 | 2/2017 | Monkowski et al. | |
| 2017/0225433 A1 * | 8/2017 | Okuyama | H01L 21/6836 |
| 2018/0173249 A1 * | 6/2018 | Hayashi | F16K 37/005 |
| 2018/0246531 A1 | 8/2018 | Somani et al. | |

FOREIGN PATENT DOCUMENTS

| | | |
|---|---|---|
| TW | 201841088 | 11/2018 |
| WO | 2012100181 A1 | 7/2012 |
| WO | 2018053538 A1 | 3/2018 |

OTHER PUBLICATIONS

Pierre Delajoud & Martin Girard, A High Accuracy, Portable Calibration Standard for Low Mass Flow, Presented Sep. 6, 1984 at the XIII IMEKO World Congress of Metrology, Torino Italy, DH Instruments, Inc., Tempe AZ, US,. CalTechnix SA Neuilly sur Seine, FR.
International Search Report and Written Opinion dated Jan. 23, 2020, issued in related International Application No. PCT/US2019/058152.
Taiwan Office Action and Search Report Appln No. 109111700 dated Apr. 3, 2024.

\* cited by examiner

ADVANCED PRESSURE BASED MASS FLOW CONTROLLERS AND DIAGNOSTICS

CROSS-REFERENCE TO RELATED APPLICATIONS

This application claims the benefit of U.S. Provisional Application No. 62/841,110 filed on Apr. 30, 2019, the entire disclosure of which is expressly incorporated herein by reference.

BACKGROUND

Equipment used in the manufacture of semiconductor wafers are required to operate with a high degree of precision in order to maintain desired production yields. In a process to create integrated circuits, semiconductor wafers are treated within a process chamber using certain chemicals. Mass Flow Controllers (MFCs) are used in an arranged configuration to deliver these chemicals to the process chamber in a timely consistent manner and with a consistent flow rate. This can be significantly challenging as the MFCs are required to hold very tight accuracies, operate at multiple set points and constantly shutdown and restart during the wafer manufacturing process. Delivering these chemicals to the process chamber while maintaining the appropriate mass flow rate with little or no delays requires precise control of flow. However, current state of the art MFCs and diagnostic systems lack a certain degree of precision which can affect wafer manufacturing yield, repeatability and uniformity.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

Figure 1:
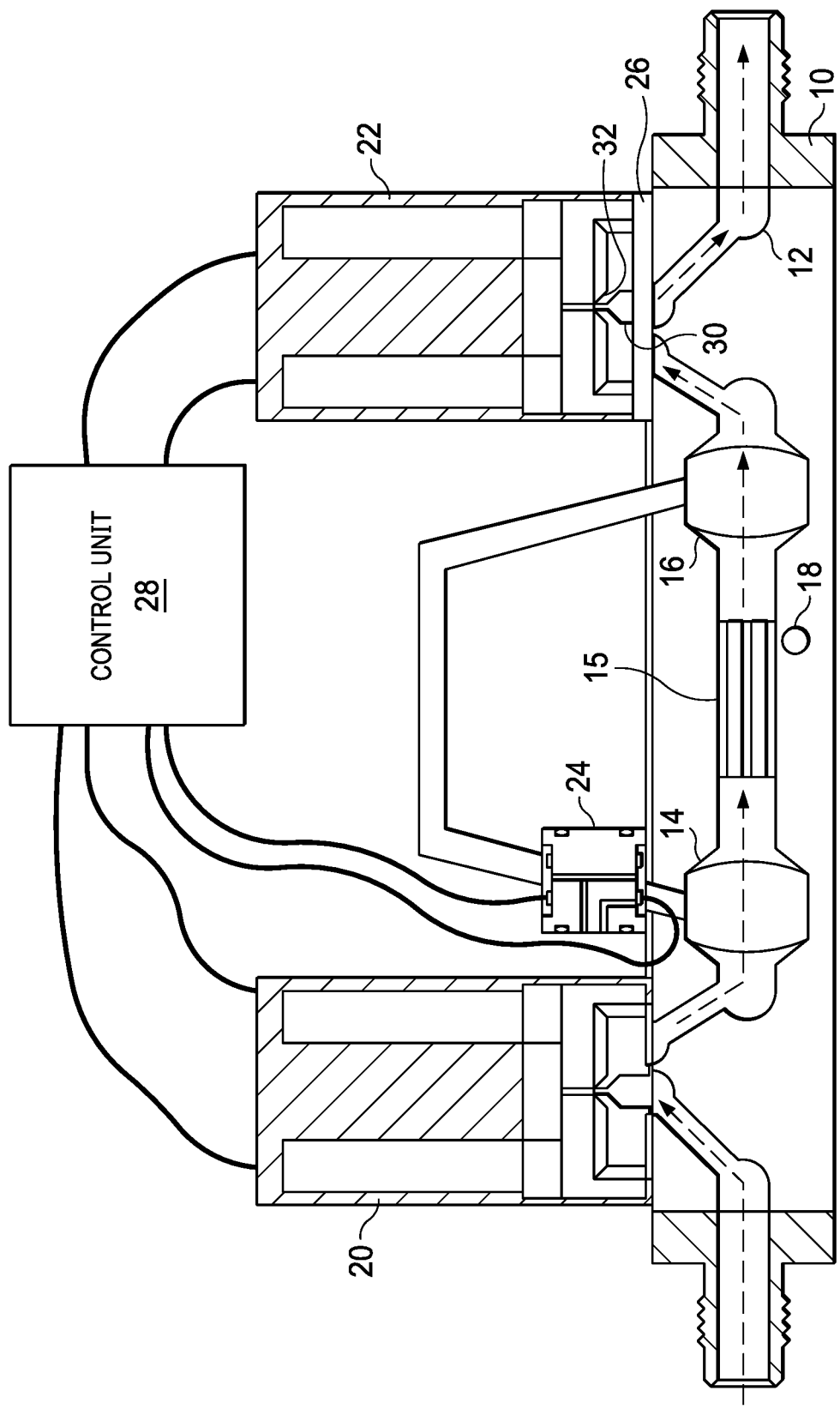
FIG. 1 is an illustration of an MFC having high precision sensors and an advanced diagnostics system, in accordance with certain example embodiments.

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

A function of a downstream solenoid/piezo valve, also called a proportional control valve, is to minimize pressure bleed down time on a delivery line when the line is shut down. Minimizing or eliminating gas flow into the volume after the proportional control valve on the control line after shutdown is critical in minimizing first wafer effects or any other performance concerns caused by the MFC. Minimizing or eliminating the bleed down effects allows the MFC to operate consistently thereby improving the process yield which can be especially important when used to maintain a consistent fluid flow rate among an array of MFCs used in delivering chemicals to a semiconductor fabrication chamber.

The present disclosure describes an MFC for controlling fluid flow rate that comprises one or more valves and at least one of a semiconductor based pressure, position, and temperature sensor. The pressure sensor can be an Absolute Pressure (P) sensor and a Differential Pressure (DP) sensor with various embodiments. The position sensor can be a capacitive, optical, strain gauge, piezo resistive, or magnetic sensor. In the embodiments described herein, position sensor(s) and pressure sensor(s) are used in combination with either an upstream valve or downstream valve or both to minimize bleed down time and optimize response time. For example, the use of the sensor(s) in combination with an upstream valve allows operation of the valve in a non-linear region of a Laminar Flow Element (LFE), which enhances accuracy. The use of the sensor(s) in combination with a downstream valve minimizes bleed down time and optimizes response time.

Upstream or upstream side, as used herein, refers to a location or side closest to a fluid source, e.g. after an upstream valve or before a downstream valve in an MFC. MFC High Pressure (HP) or HP side, as used herein, refers to the upstream or upstream side. Downstream or downstream side, as used herein, refers to the location or side farthest from a fluid source. Low Pressure (LP) or LP side, as used herein refers to the downstream or downstream side. Pressure pre-determined value or values, as used herein, refer to a-priori variables that include flow rate values based on test data and a Laminar Flow Element (LFE). Position pre-determined value or values, as used herein, refer to a-priori variables that include valve seat position values based on variables that include valve seat position values and fluid flow rates. Valve seat opening, as used herein, refers to the valves instant position in either the valve's closed state or open state or any position in between the closed and open state. Cell, as used herein, is a collection of one or more sensors in a common package designed to perform a function, i.e. a sensor that performs a sensing function. A cell can utilize small semiconductor based pressure sensors called die, described in reference to FIG. 3. Volume, as used herein, are reservoirs of known volume used as a point in a flow line to take pressure measurements of fluid flowing through the flow line.

In a first use case, an MFC utilizes an upstream and downstream valve, either Piezo or Solenoid or a combination thereof, and at least one DP sensor, P sensor, or DP+P sensor to sense upstream and downstream pressure across the LFE. A control unit of the MFC utilizes sensed pressure and an LFE predetermined value, i.e. a characterized LFE, to calculate flow rate and, if needed, tune operational characteristics, such as valve seat opening, of at least one of the valves. The control unit controls flow by keeping either the upstream valve or downstream valve in a biased wide-open position and modulating at least one of the open and closed position of the other valve to control flow. Additionally, the MFC can be utilized to operate both valves at the same time with one valve fully open and another valve only partially open or both only partially open. For example, when controlling flow out of the MFC using the downstream valve, the upstream valve can be manipulated to control the rate of gas into the MFC in order to maintain a constant pressure downstream, i.e. use the valve to act as an electronic regulator. This mitigates unwanted flow perturbations out of the MFC when subjected to changing inlet pressures, i.e. pressure sensitivity. Due to the sensitivity of the semiconductor based sensor or sensors, the control unit can reduce or eliminate bleed off of the modulated valve after it is shutdown thereby improving the turn off response time of the MFC and being ready to start the next process thereafter.

In a second use case, the MFC utilizes a high precision position sensor. The size of the position sensor is resolution appropriate for a desired flow rate, e.g. 5 nanometer (nm) or less position sensor integrated into a downstream valve. Given the accuracy of the position sensor and predetermined variables, valve displacement can be measured and flow rate calculated based on an actual sensor measurement of valve displacement and a predetermined value, i.e. Flow Rate=f (Opening, Press and Temp). Additionally, the position sensor can be used to quickly drive the downstream valve from a closed to open position based on either a preprogrammed position (feed forward control) or a pre-known (user supplied) position to enable fast response In a third use case, the MFC allows for a RoF, "Rate of Pressure Fall" or RoD, "Rate of Pressure Decay" method of verification of flow rate in situ. During a steady state flow rate, the upstream valve can be shut off and the opening of the valve seat position in the downstream valve can be increased to compensate for the reduced pressure and keep the flow rate out of the MFC constant. During this process, the control unit can use the DP and P sensors to verify flow rate. The control unit can measure and compare the flow rate out of the MFC via multiple methods. One method measures the rate of pressure fall over time, dp/dt, in the known volume(s) to calculate the flow rates out of the MFC. A second method determines flow out of the MFC via comparing the current values of pressure to the downstream valve, temperature and the valve seat opening to a-priori values at know flow rates. When the pressure drops sufficiently the upstream valve is opened again to return to DP+P control.

In a fourth use case, the MFC utilizes an upstream and downstream valve, either Piezo or Solenoid or a combination thereof, and at least one DP sensor, P sensor, or DP+P sensor to sense upstream and downstream pressure and a position sensor integrated with or used with the downstream valve to sense position of the downstream valve. A control unit of the MFC utilizes sensed pressure and an LFE predetermined value, i.e. characterized, to calculate flow rate. The control unit also utilizes sensed position to determine a valve seat predetermined value and, therefore, the corresponding flow rate. The calculated flow rate and corresponding flow rate can be compared to determine flow rate accuracy.

In a fifth use case, the accuracy of the MFC is compromised when the MFC is operates a downstream valve, e.g., under non-steady state conditions, due to pressures changing in the downstream volume. The pressure changes in the volume are due to changing masses caused by flow into and out of the MFC and through the LFE. In this case, the RoF/RoD, as described in the third use case, can be used to correct for the changing mass.

The MFC presented herein provides options that can enable a user to create early warning/prognostics or SPC (Statistical Process Control) analysis algorithms that can ensure wafer-to-wafer uniformity and process repeatability and reproducibility.

Referring now to FIG. 1, illustrated is an MFC having high precision sensors and an advanced diagnostics system, in accordance with example embodiments. The MFC comprises a base platform 10, a tubing channel 12 having volume 14, LFE 15, volume 16, temperature sensor 18, valve assembly having, in this embodiment, valves 20, 22, semiconductor based pressure, and optionally, temperature sensors integrated within housing unit 24, semiconductor based position sensor 26 integrated within the valve assembly, and control unit 28 communicable coupled to the valves 20, 22 and sensors. In an embodiment, an additional temperature sensor 18 can be integrated within housing 24 along with the other sensors in order to compensate for any temperature induced effects on the operation of the other sensors may have on actual measurements.

In practice, the base platform 10 is coupled to an upstream fluid source through a flow line and to a downstream process chamber. The fluid flows through the tubing channel 12 where the sensor(s) in housing unit 24 can sense pressure and, optionally, temperature in volumes 14 and 16. The ambient temperature can also be determined using temperature sensor 18. Although not illustrated, temperature sensor 18 also includes a communication line to the control unit 28. In certain embodiments, the sensor 24 can include a High Pressure (HP) side (upstream) pressure sensor and Low Pressure (LP) side pressure sensor. The HP side and LP side can each include at least one Absolute Pressure (P) sensor and at least one Differential Pressure (DP) sensor. In practice, the control unit 28 maintains operational control of the valves 20, 22 based on a desired flow rate, i.e. the set point, and sensor measurements. With respect to the position sensor 26, the control unit 28 can determine the position of the valve 22 as the valve stem and disc 32 transitions to and from the valve seat 32 during its opening and closing operations. The control unit 28 can use the sensed data to perform diagnostics and control MFC operation.

Although the embodiments described herein refer to the pressure sensors and position sensor 24 as both being semiconductor based, it should be understood that in some embodiments only one of the sensors or one type of the sensor may be semiconductor based. It should also be understood that in practice the MFC may be communicable coupled to other equipment, such as wafer fabrication machinery. As such, the MFC may not need to be configured to include the pressure sensors or all pressure sensors; since, e.g., the wafer fabrication machinery may provide pressure measurements for the downstream side or the upstream side. It should also be understood that the valve assembly may only comprise valve 20 or valve 22, depending on the application.

Figure 2:
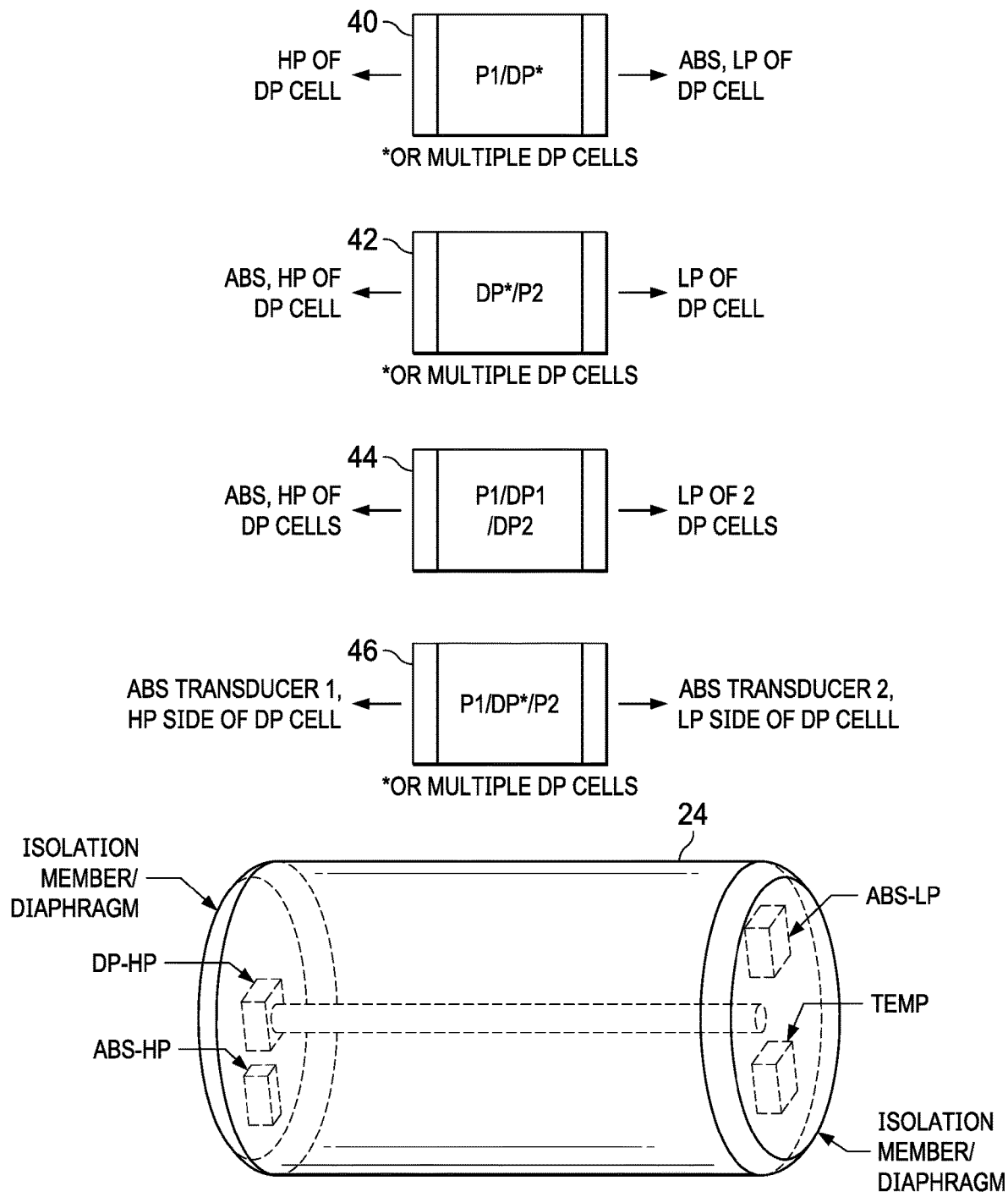
FIG. 2 is an illustration of different configurations of combined pressure transducers, i.e. cells, with various HP and LP, P and DP circuits formed therein and a housing unit incorporating a configuration of cells/circuits therein, in accordance with certain example embodiments.

Referring now to FIG. 2, illustrated are different ICs, i.e. cells, with various HP and LP, P and DP circuits formed therein and housing unit 24 incorporating a configuration of cells/circuits therein, in accordance with example embodiments. Cells 40-46 include at least one P cell and at least one DP cell. In this embodiment, the cells are configured to operate in high pressure and low pressure ranges and in multiple pressure ranges. The housing unit 24 is configured to include a LP P sensor, temperature sensor, an HP DP sensor, and HP P sensor. Although, obviously, the housing unit 24 can be configured to include any cell configuration. The temperature sensor can be a diode or thermistor or other known in the art i.e. platinum temperature sensor.

Figure 3:
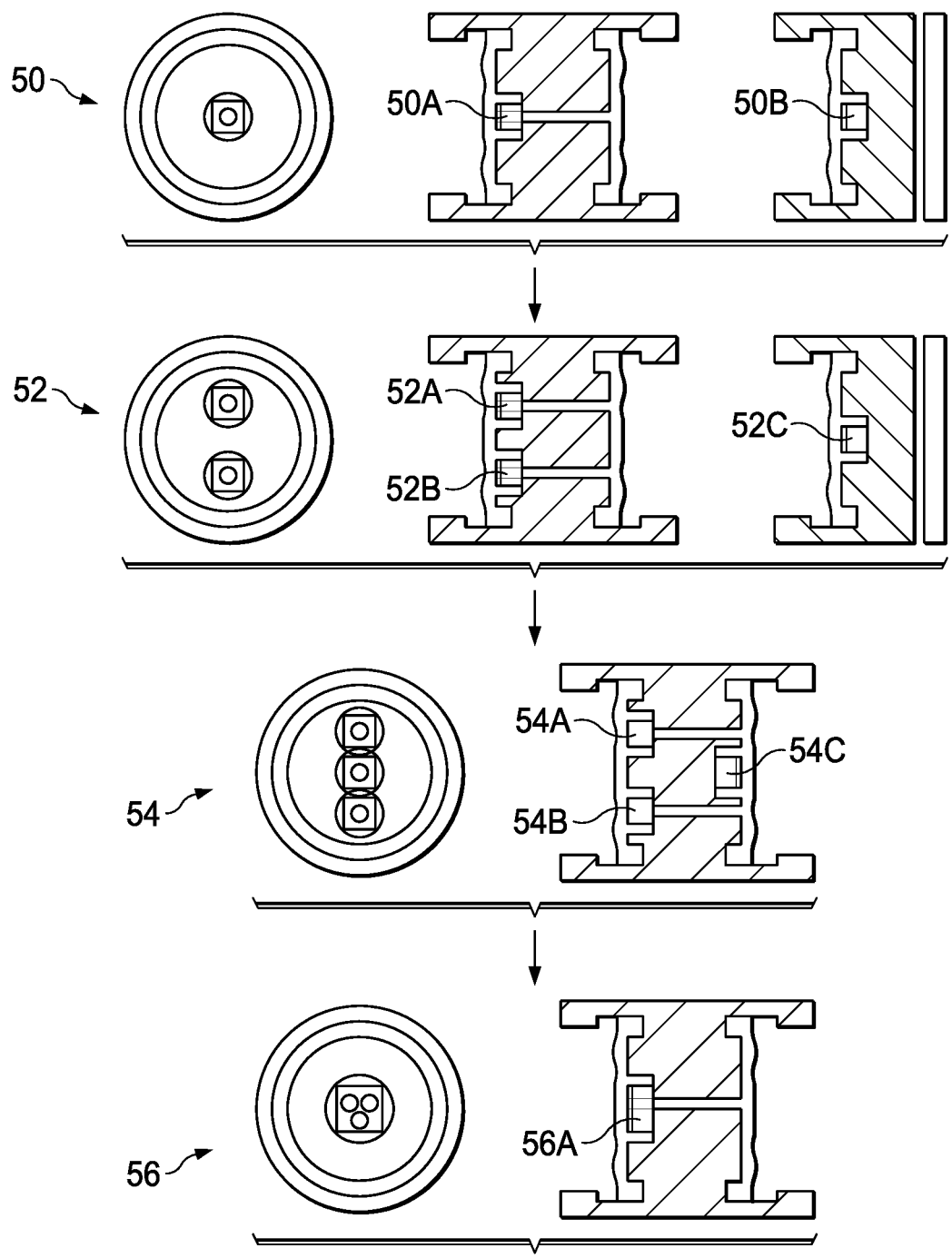
FIG. 3 is an illustration of different configurations of combined pressure transducers that includes various pressure sensing die configurations, in accordance with certain example embodiments.

Referring now to FIG. 3, illustrated are individual cells 50-56 that includes various die configurations, in accordance with example embodiments. The die are designed to reduce manufacturing costs, reduce size, and improve cell accuracy. The die is the functional circuit of the cell. Cell 50 is an individual package that houses a single die 50A or 50B. Die 50A includes a DP functional circuit and die 50B includes a P functional circuit. In this embodiment, the die 50A and 50B are packaged separately which are later joined together through welding or alternative methods. Cell 52 includes die 52A and 52B, both of which are DP functional circuits. The range of each DP functional circuit can be unique so that the cell can be operated over larger range or over differing ranges. However, because the DP functional circuits are fabricated together and packaged together, fabrication costs are reduced and the cell's useable range and accuracy is improved, since operational or cell redundancy is eliminated. In this particular embodiment, die 52C comprises a P functional circuit and the P functional circuit is packaged separately from the DP cells which are later joined together through welding or alternative methods. Cell 54 includes die 54A, 54B, and 54C. Die 54A and 54B are DP functional circuits and 54C is a P functional circuit. In this particular configuration, all dies are fabricated together and, therefore, packaged together. This, again, reduces fabrication costs and improves accuracy. Finally, cell 56 includes one die 56A. The die 56A includes one or more DP functional cells and one or more P functional cell and an optional temperature measurement cell. The aforementioned die configurations are not exhaustive and other configurations are certainly possible, e.g. cells with a die or dies having multiple P functional circuits.

Figure 4:
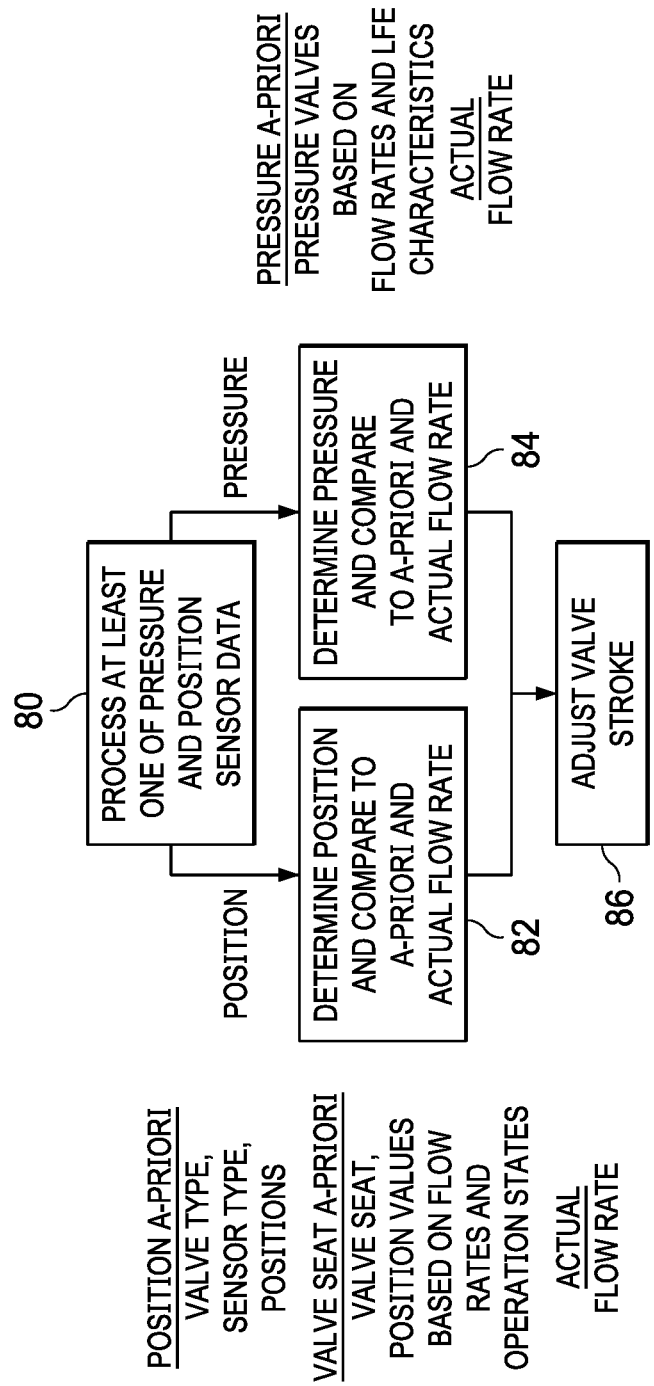
FIG. 4 is an illustration of a control and diagnostics algorithm, in accordance with certain example embodiments.

Referring now to FIG. 4, illustrated is a control and diagnostics algorithm, in accordance with example embodiments. The algorithm begins at block 80 where temperature and at least one of pressure and position sensor data is processed. The pressure data can include either DP (Differential Pressure) or P (Absolute Pressure) data or both. At block 82, the position of an upstream valve is determined based on position a-priori data. The position a-priori data is based on test data, such as operational states, flow rates, a particular valve, and particular position sensor. The valve position is compared to valve seat a-priori data and actual flow rates to determine the correct valve seat position. The valve seat a-priori data is based on test data, such as operational states, flow rates, and valve seat positions. At block 84, the pressure is determined based on a-priori data, the flow rate is determined based on the determined pressure and known volume, and the flow rate compared against the actual flow rate. The pressure a-priori data are pressure values based on flow rates and LFE characteristics.

Figure 5:
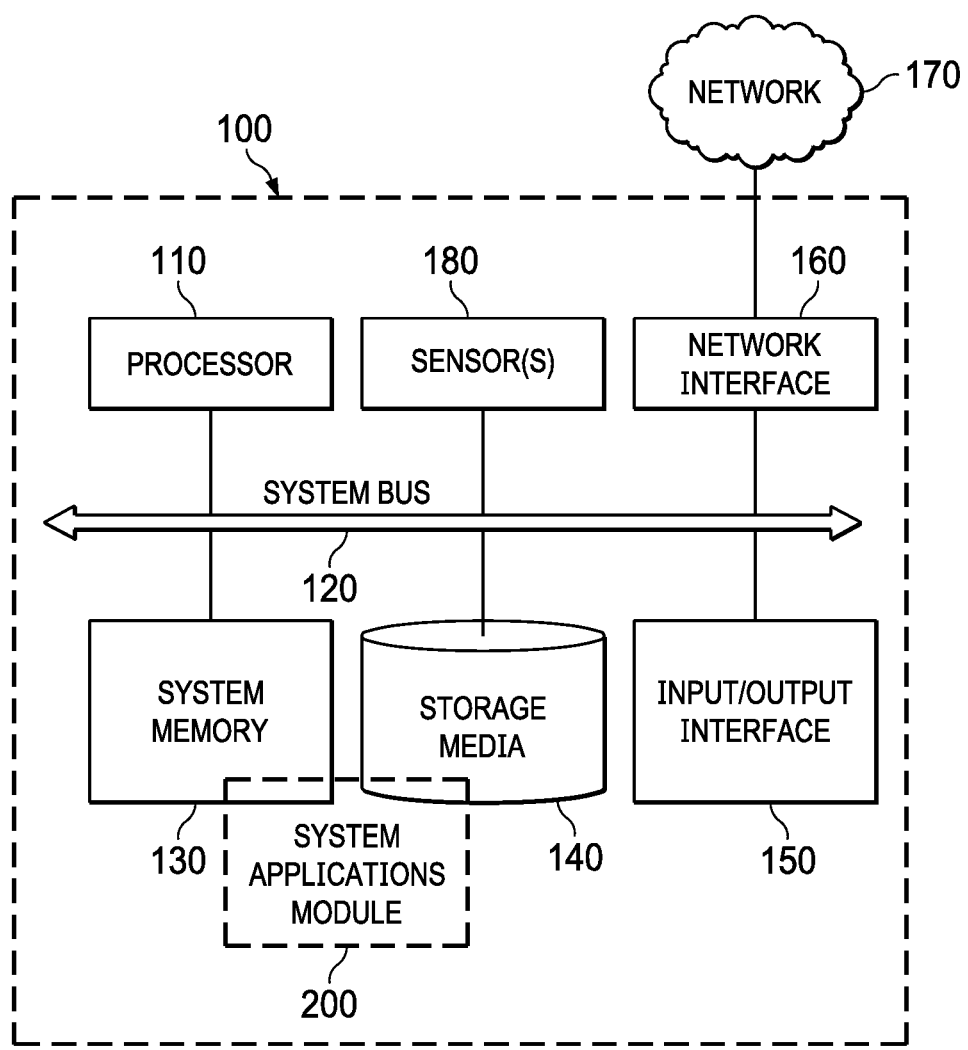
FIG. 5 is an illustration of a computing machine and a system applications module, in accordance with certain example embodiments.

Referring now to FIG. 5, illustrated is a computing machine 100 and a system applications module 200, in accordance with example embodiments. The computing machine 100 can correspond to any of the various computers, mobile devices, laptop computers, servers, embedded systems, or computing systems presented herein. The module 200 can comprise one or more hardware or software elements, e.g. other OS application and user and kernel space applications, designed to facilitate the computing machine 100 in performing the various methods and processing functions presented herein. The computing machine 100 can include various internal or attached components such as a processor 110, system bus 120, system memory 130, storage media 140, input/output interface 150, a network interface 160 for communicating with a network 170, e.g. cellular/GPS, Bluetooth, WIFI, or Devicenet, EtherCAT, Analog, RS485, etc., and one or more sensors 170.

The computing machines can be implemented as a conventional computer system, an embedded controller, a laptop, a server, a mobile device, a smartphone, a wearable computer, a customized machine, any other hardware platform, or any combination or multiplicity thereof. The computing machines can be a distributed system configured to function using multiple computing machines interconnected via a data network or bus system.

The processor 110 can be designed to execute code instructions in order to perform the operations and functionality described herein, manage request flow and address mappings, and to perform calculations and generate commands. The processor 110 can be configured to monitor and control the operation of the components in the computing machines. The processor 110 can be a general purpose processor, a processor core, a multiprocessor, a reconfigurable processor, a microcontroller, a digital signal processor ("DSP"), an application specific integrated circuit ("ASIC"), a controller, a state machine, gated logic, discrete hardware components, any other processing unit, or any combination or multiplicity thereof. The processor 110 can be a single processing unit, multiple processing units, a single processing core, multiple processing cores, special purpose processing cores, co-processors, or any combination thereof. According to certain embodiments, the processor 110 along with other components of the computing machine 100 can be a software based or hardware based virtualized computing machine executing within one or more other computing machines.

The system memory 130 can include non-volatile memories such as read-only memory ("ROM"), programmable read-only memory ("PROM"), erasable programmable read-only memory ("EPROM"), flash memory, or any other device capable of storing program instructions or data with or without applied power. The system memory 130 can also include volatile memories such as random access memory ("RAM"), static random access memory ("SRAM"), dynamic random access memory ("DRAM"), and synchronous dynamic random access memory ("SDRAM"). Other types of RAM also can be used to implement the system memory 130. The system memory 130 can be implemented using a single memory module or multiple memory modules. While the system memory 130 is depicted as being part of the computing machine, one skilled in the art will recognize that the system memory 130 can be separate from the computing machine 100 without departing from the scope of the subject technology. It should also be appreciated that the system memory 130 can include, or operate in conjunction with, a non-volatile storage device such as the storage media 140.

The storage media 140 can include a hard disk, a floppy disk, a compact disc read-only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 140 can store one or more operating systems, application programs and program modules, data, or any other information. The storage media 140 can be part of, or connected to, the computing machine. The storage media 140 can also be part of one or more other computing machines that are in communication with the computing machine such as servers, database servers, cloud storage, network attached storage, and so forth.

The applications module 200 and other OS application modules can comprise one or more hardware or software elements configured to facilitate the computing machine with performing the various methods and processing functions presented herein. The applications module 200 and other OS application modules can include one or more algorithms or sequences of instructions stored as software or firmware in association with the system memory 130, the storage media 140 or both. The storage media 140 can therefore represent examples of machine or computer readable media on which instructions or code can be stored for execution by the processor 110. Machine or computer readable media can generally refer to any medium or media used to provide instructions to the processor 110. Such machine or computer readable media associated with the applications module 200 and other OS application modules can comprise a computer software product. It should be appreciated that a computer software product comprising the applications module 200 and other OS application modules can also be associated with one or more processes or methods for delivering the applications module 200 and other OS application modules to the computing machine via a network, any signal-bearing medium, or any other communication or delivery technology. The applications module 200 and other OS application modules can also comprise hardware circuits or information for configuring hardware circuits such as microcode or configuration information for an FPGA or other PLD. In one exemplary embodiment, applications module 200 and other OS application modules can include algorithms capable of performing the functional operations described by the flow charts (modes of operation) computer systems presented herein.

The input/output ("I/O") interface 150 can be configured to couple to one or more external devices, to receive data from the one or more external devices, and to send data to the one or more external devices. Such external devices along with the various internal devices can also be known as peripheral devices. The I/O interface 150 can include both electrical and physical connections for coupling the various peripheral devices to the computing machine or the processor 110. The I/O interface 150 can be configured to communicate data, addresses, and control signals between the peripheral devices, the computing machine, or the processor 110. The I/O interface 150 can be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 150 can be configured to implement only one interface or bus technology. Alternatively, the I/O interface 150 can be configured to implement multiple interfaces or bus technologies. The I/O interface 150 can be configured as part of, all of, or to operate in conjunction with, the system bus 120. The I/O interface 150 can include one or more buffers for buffering transmissions between one or more external devices, internal devices, the computing machine, or the processor 120.

The I/O interface 120 can couple the computing machine to various input devices including mice, touch-screens, scanners, electronic digitizers, sensors, receivers, touchpads, trackballs, cameras, microphones, keyboards, any other pointing devices, or any combinations thereof. The I/O interface 120 can couple the computing machine to various output devices including video displays, speakers, printers, projectors, tactile feedback devices, automation control, robotic components, actuators, motors, fans, solenoids, valves, pumps, transmitters, signal emitters, lights, and so forth.

The computing machine 100 can operate in a networked environment using logical connections through the NIC 160 to one or more other systems or computing machines across a network. The network can include wide area networks (WAN), local area networks (LAN), intranets, the Internet, wireless access networks, wired networks, mobile networks, telephone networks, optical networks, or combinations thereof. The network can be packet switched, circuit switched, of any topology, and can use any communication protocol. Communication links within the network can involve various digital or an analog communication media such as fiber optic cables, free-space optics, waveguides, electrical conductors, wireless links, antennas, radio-frequency communications, and so forth.

The one or more sensors 170 can be a position sensor and pressure sensors. The pressure sensor can be an Absolute Pressure (P) sensor or a Differential Pressure (DP) sensor. The position sensor can be a capacitive, optical, strain gauge, or magnetic sensor. The sensors 170 can be traditional sensors or semiconductor based sensors.

The processor 110 can be connected to the other elements of the computing machine or the various peripherals discussed herein through the system bus 120. It should be appreciated that the system bus 120 can be within the processor 110, outside the processor 110, or both. According to some embodiments, any of the processors 110, the other elements of the computing machine, or the various peripherals discussed herein can be integrated into a single device such as a system on chip ("SOC"), system on package ("SOP"), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions unless otherwise disclosed for an exemplary embodiment. Further, a skilled programmer would be able to write such a computer program to implement an embodiment of the disclosed embodiments based on the appended flow charts, algorithms and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the description herein.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. The scope of the claims is intended to broadly cover the disclosed embodiments and any such modification. Further, the following clauses represent additional embodiments of the disclosure and should be considered within the scope of the disclosure:

Clause 1, a mass flow controller for controlling fluid flow rate, the mass flow controller comprising: a valve assembly in fluid communication with at least one upstream location and at least one downstream location; at least one semiconductor based pressure sensor in fluid communication with the at least one upstream location and the at least one downstream location; and a controller communicable coupled with the valve assembly and the at least one pressure sensor, wherein the controller: determines pressure for the at least one upstream location and the at least one downstream location; causes an adjustment to valve stroke of at least one valve in fluid communication with at least one of the upstream and downstream locations based on an actual fluid flow rate, the pressure, and a predetermined value;

Clause 2, the mass flow controller of clause 1, wherein: the at least one valve is either a piezoelectric or solenoid valve; and the pressure sensor is at least one of an absolute pressure sensor and differential pressure sensor;

Clause 3, the mass flow controller of clause 1, further comprising a position sensor communicable coupled with the at least one valve;

Clause 4, The mass flow controller of claim 3, wherein the position sensor is one of a semiconductor based position sensor, capacitance based position sensor, resistance based position sensor, piezo resistive based position sensor and capacitance based position sensor;

Clause 5, the mass flow controller of clause 3, wherein the controller: determines position of the at least one valve; causes an adjustment to valve stroke of the at least one valve based on the actual fluid flow rate and at least the pressure, position, and another predetermined valve;

Clause 6, the mass flow controller of clause 3, wherein the controller: determines the position of at least one valve; and causes an adjustment to the position of the least one valve based on a shutdown signal and the actual fluid flow rate and at least the position, the pressure, and the predetermined value and the other predetermined value;

Clause 7, the mass flow controller of clause 1, wherein: the predetermined value is based on pressure a-priori information; and the other predetermined value is based on position a-priori information;

Clause 8, the mass flow controller of clause 1, further comprising a position sensor and a temperature sensor, wherein the position sensor is communicable coupled with the at least one valve;

Clause 9, the mass flow controller of clause 8, wherein at least one of the position sensor and the temperature sensor is a semiconductor based sensor;

Clause 10, the mass flow controller of clause 8, wherein the controller: determines position of the at least one valve; determines temperature; and causes an adjustment to valve stroke of the at least one valve based on the actual fluid flow rate and at least the pressure, position, temperature, and the predetermined valve;

Clause 11, a method of controlling fluid flow rate using a mass flow controller, the method comprising: controlling fluid flow rate between at least one upstream location and at least one downstream location; sensing pressure at the at least one upstream location and the at least one downstream location using at least one semiconductor based pressure sensor; determining pressure at the at least one upstream location and at least one downstream location; adjusting the flow rate by causing an adjustment of a valve stroke of at least one valve in fluid communication with at least one of the upstream location and the at least one downstream location based on an actual fluid flow rate, the pressure, and a predetermined value;

Clause 12, the method of clause 11, further comprising: sensing position of the at least one valve from a position sensor communicable coupled with the at least one valve; determining position of the least one valve; adjusting the flow rate by causing an adjustment to valve stroke of at least one valve in fluid communication with at least one of the upstream location and the at least one downstream location based on the actual fluid flow rate and at least the pressure, position, and another predetermined valve;

Clause 13, the method of clause 12, wherein the position sensor is one of a semiconductor based position sensor, capacitance based position sensor, resistance based position sensor, and capacitance based position sensor;

Clause 14, the method of clause 11, further comprising: sensing position of the at least one valve using a position sensor communicable coupled with the at least one valve; sensing temperature in a valve assembly using a temperature sensor; determining position of at least one valve; determining temperature; determining fluid flow rate; and causing an adjustment to valve stroke of at least one valve in fluid communication with at least one of the upstream location and the at least one downstream location based on the actual fluid flow rate and at least the pressure, position, temperature, the predetermined valve, and the other predetermined value;

Clause 15, the method of clause 14, wherein at least one of the position sensor and the temperature sensor is a semiconductor based position sensor;

Clause 16, the method of clause 11, wherein the predetermined value is a fluid flow rate based, at least in part, on characteristics of a laminar flow element;

Clause 17, the method of clause 11, wherein: the predetermined value is based on pressure a-priori information; and the other predetermined value is based on position a-priori information;

Clause 18, a mass flow controller for controlling fluid flow rate, the mass flow controller comprising: a valve assembly in fluid communication with at least one upstream location and at least one downstream location; at least one semiconductor based position sensor communicable coupled with at least one valve of the valve assembly; a controller communicable coupled with the valve assembly and the at least one position sensor, wherein the controller: determines position for the at least one valve; causes an adjustment to valve stroke of at least one valve in fluid communication with at least one of the upstream and downstream locations based on an actual fluid flow rate, a pressure measurement associated with at least one of an upstream location and a downstream location, the position, and a predetermined value;

Clause 19, the mass flow controller of clause 18, wherein the predetermined value is based on a-priori position information; and Clause 20, the mass flow controller of claim 18, further comprising: a semiconductor based temperature sensor; wherein the controller: determines position of the at least one valve; determines temperature; and causes an adjustment to valve stroke of the at least one valve based on the actual fluid flow rate and at least the pressure, position, temperature, and the predetermined valve.

What is claimed is:

1. A mass flow controller for controlling fluid flow rate, the mass flow controller comprising:
   a valve assembly comprising at least one valve and being in fluid communication with at least one upstream location and at least one downstream location in a same flow path as the upstream location, wherein the at least one valve has a valve stem and a valve seat;
   at least one semiconductor based pressure sensor in fluid communication with the at least one upstream location and the at least one downstream location;
   a position sensor communicably coupled with the at least one valve; and
   a controller communicably coupled with the valve assembly and the at least one pressure sensor, wherein the controller is configured to:
      determine pressures for the upstream location and the downstream location; and
      control the valve assembly to adjust a valve stroke of the at least one valve in fluid communication with the upstream and downstream locations based on an actual fluid flow rate and a desired positive fluid flow rate;
      receive a value indicative of a measurement of an actual position of the valve stem from the position sensor as the valve stem moves from the valve seat following the adjustment; and
      perform diagnostics on the mass flow controller by comparing the actual position of the valve stem relative to a predetermined position of the valve stem, the predetermined position of the valve stem determined in response to the desired positive fluid flow rate, the predetermined position determined from a predetermined relationship between the pressures for the upstream location and the downstream location and the position of the valve stem, and determined from a predetermined relationship between the desired positive fluid flow rate and the valve stroke.

2. The mass flow controller of claim 1, wherein:
   the at least one valve is either a piezoelectric or solenoid valve; and
   the pressure sensor is at least one of an absolute pressure sensor and differential pressure sensor.

3. The mass flow controller of claim 1, wherein the at least one semiconductor based pressure sensor comprises an absolute pressure sensor and a differential pressure sensor, and wherein both the absolute pressure sensor and the differential pressure sensor are integrated on a single cell.

4. The mass flow controller of claim 1, wherein the position sensor is one of a semiconductor based position sensor, capacitance based position sensor, resistance based position sensor, piezo resistive based position sensor, and capacitance based position sensor.

5. The mass flow controller of claim 3, wherein the controller:
   determines a further measurement of the position of at least one valve;
   causes an adjustment to valve stroke of the at least one valve based on the actual fluid flow rate and at least the further measurement, and another predetermined value.

6. The mass flow controller of claim 3, wherein the controller:
   determines the position of at least one valve; and
   causes an adjustment to the position of the least one valve based on a shutdown signal and the actual fluid flow rate and at least the measurement, the predetermined value, and another predetermined value.

7. The mass flow controller of claim 1, further comprising a position sensor and a temperature sensor, wherein the position sensor is integral to the at least one valve.

8. The mass flow controller of claim 7, wherein at least one of the position sensor and the temperature sensor is a semiconductor based sensor.

9. The mass flow controller of claim 7, wherein the controller:
   determines position of the at least one valve;
   determines temperature; and
   causes an adjustment to valve stroke of at least one valve based on the actual fluid flow rate and at least the position, temperature, and the predetermined value.

10. A method of controlling fluid flow rate using a mass flow controller, the method comprising:
    controlling fluid flow rate between at least one upstream location and at least one downstream location in a same flow path as the upstream location;
    sensing pressure at the at least one upstream location and the at least one downstream location using at least one semiconductor based pressure sensor;
    determining pressure at the at least one upstream location and the at least one downstream location;
    adjusting the flow rate by causing an adjustment of a valve stroke of at least one valve in fluid communication with the upstream location and the downstream location based on an actual fluid flow rate, the pressures at the at least one upstream location and the at least one downstream location, and a predetermined valve position based on pressure a-priori information, wherein the at least one valve has a valve stem and a valve seat;
    receiving measurement data from the position sensor to determine the position of the valve stem as the valve stem transitions away from the valve seat; and
    performing diagnostics on the mass flow controller by comparing the actual measurement of valve displacement relative to a predetermined value of calculated valve displacement based on position a-priori information and the pressure a-priori information.

11. The method of claim 10, wherein receiving data from the at least one semiconductor based pressure sensor comprises receiving data from an absolute pressure sensor and a differential pressure sensor, and wherein both the absolute pressure sensor and the differential pressure sensor are integrated on a single cell.

12. The method of claim 11, wherein the position sensor is one of a semiconductor based position sensor, capacitance based position sensor, resistance based position sensor, and capacitance based position sensor.

13. The method of claim 10, further comprising:
sensing position of the at least one valve using a position sensor integrated within the at least one valve during movement of the at least one valve away from a valve seat;
sensing temperature in a valve assembly using a temperature sensor;
determining position of the at least one valve;
determining temperature;
determining fluid flow rate; and
causing an adjustment to valve stroke of at least one valve in fluid communication with at least one of the upstream location and the at least one downstream location based on an actual fluid flow rate, temperature, and a predetermined value.

14. The method of claim 13, wherein at least one of the position sensor and the temperature sensor is a semiconductor based position sensor.

15. The method of claim 10, wherein the predetermined value is a fluid flow rate based, at least in part, on characteristics of a laminar flow element, and a value position provided by a signal from the position sensor.

16. A mass flow controller for controlling fluid flow rate, the mass flow controller comprising:
a valve assembly comprising at least one valve and being in fluid communication with at least one upstream location and at least one downstream location in a same flow path as the upstream location, wherein the at least one valve has a valve stem and a valve seat;
at least one position sensor communicably coupled with at least one valve of the valve assembly;
a controller communicably coupled with the valve assembly and the at least one position sensor, wherein the controller is configured to:
determine a position of the valve stem for the at least one valve in response to measurement data received from the position sensor, wherein the position of the valve stem is used to perform diagnostics on the mass flow controller by comparing an actual measurement of valve displacement during transition away from the valve seat relative to a predetermined value of calculated valve displacement, the predetermined value of calculated valve displacement determined from a predetermined relationship between the pressures for the upstream location and the downstream location and the position of the valve stem, and determined from a predetermined relationship between the desired positive fluid flow rate and the position of the valve stem; and
control the valve assembly to adjust a valve stroke of the at least one valve in fluid communication with the upstream and downstream locations based on an actual fluid flow rate, pressure measurements associated with the at least one upstream location and the at least one downstream location, the position of the valve stem, and the predetermined value.

17. The mass flow controller of claim 16, wherein the predetermined value is based on a-priori position information.

18. The mass flow controller of claim 16, further comprising: a semiconductor based temperature sensor;
wherein the controller:
determines position of at least one valve;
determines temperature; and
causes an adjustment to valve stroke of the at least one valve based on the actual fluid flow rate and at least the pressure measurement, the position, the temperature, and the predetermined value.

* * * * *